(12) United States Patent
Inamdar et al.

(10) Patent No.: US 12,543,040 B2
(45) Date of Patent: Feb. 3, 2026

(54) CONTINUOUS AUTHENTICATION OF PEERS IN NETWORKS USING POST-QUANTUM PRE-SHARED KEYS

(71) Applicant: Cisco Technology, Inc., San Jose, CA (US)

(72) Inventors: Amjad Inamdar, Bengaluru (IN); Sujal Rajendrabhai Sheth, Ahmedabad (IN); Anoop V. A., Bengaluru (IN); Krishna Priya Balakrishnan, Kerala (IN)

(73) Assignee: Cisco Technology, Inc., San Jose, CA (US)

( * ) Notice: Subject to any disclaimer, the term of this patent is extended or adjusted under 35 U.S.C. 154(b) by 252 days.

(21) Appl. No.: 18/521,006

(22) Filed: Nov. 28, 2023

(65) Prior Publication Data

US 2025/0175795 A1 May 29, 2025

(51) Int. Cl.
*H04L 29/06* (2006.01)
*H04L 9/08* (2006.01)
*H04W 12/065* (2021.01)
*H04W 12/069* (2021.01)

(52) U.S. Cl.
CPC ......... *H04W 12/069* (2021.01); *H04L 9/0852* (2013.01); *H04W 12/065* (2021.01)

(58) Field of Classification Search
CPC .. H04W 12/065; H04W 12/069; H04L 9/0852
See application file for complete search history.

(56) References Cited

U.S. PATENT DOCUMENTS

| 2017/0126645 A1 | 5/2017 | Froelicher |
| 2021/0273799 A1 | 9/2021 | Kampati |
| 2022/0263811 A1 | 8/2022 | Kampati |

(Continued)

OTHER PUBLICATIONS

"Configuring Quantum-Safe Encryption Using Postquantum Preshared Keys," downloaded from https://www.cisco.com/c/en/us/td/docs/routers/ios/config/17-x/sec-vpn/b-security-vpn/m-sec-cfg-quantum-encryption-ppk.pdf, Nov. 16, 2023, 14 pages.

(Continued)

*Primary Examiner* — Jeffrey C Pwu
*Assistant Examiner* — Thong P Truong
(74) *Attorney, Agent, or Firm* — Lee & Hayes, P.C.

(57) ABSTRACT

Techniques and architecture are described for reauthentication of two IPsec peers, during a key refresh process. The peers may reauthenticate each other based upon a shared secret, which in configurations, is a PPK. In configurations the PPKs are stirred (mixed with DH/ECDH) during key derivation while refreshing the session keys during IKE_v2 and IPsec rekey. This may involve communicating the PPK-ID from a rekey initiator to a rekey responder by adding a PPK_ID payload in the rekey message exchange. This enables stronger quantum safe session keys, when dynamic PPK is used or when the manual PPK is rotated frequently. In configurations, the knowledge of the shared PPK is proved by having both peers exchange authentication payloads signed with a PPK. This involves exchanging a IKEv2 NOTIFY payload "AUTH_PPK" to carry PPK-signed authentication data. This serves the purpose of frequent re-authentication of the peers as part of the key refreshes.

20 Claims, 8 Drawing Sheets

(56) References Cited

U.S. PATENT DOCUMENTS

| | | |
|---|---|---|
| 2023/0071333 A1 | 3/2023 | Inamdar |
| 2023/0318818 A1 | 10/2023 | Sinha |
| 2024/0129115 A1* | 4/2024 | Ren ....................... H04L 9/0869 |

OTHER PUBLICATIONS

Y. Nir, "Repeated Authentication in Internet Key Exchange (IKEv2) Protocol," The Internet Society, Network Working Group, Request for Comments: 4478, Category: Experimental, Apr. 2006, 5 pages.

* cited by examiner

CONTINUOUS AUTHENTICATION OF PEERS IN NETWORKS USING POST-QUANTUM PRE-SHARED KEYS

TECHNICAL FIELD

The present disclosure relates generally to methods of authentication of peers in networks using post-quantum pre-shared keys (PPKs), and more particularly, to methods of continuous authentication of peers in networks using PPKs by re-authenticating the peers during a key refresh process.

BACKGROUND

Internet key exchange (IKE)v2/Internet Protocol security (IPsec) is the foundation of secure connectivity solutions widely deployed today in networks such as, for example, software-defined wide area network (SDWAN), secure access service edge (SASE), remote access, and Internet of Things (IoT). For example, IKEv2/IPsec may be used for secure tunnels to secure Internet gateways (SIG), secure tunnels to infrastructure as a service (IaaS) cloud virtual private clouds (VPCs) and virtual networks (vNets), secure tunnels from remote access clients, and secure tunnels from IoT gateways and small office/home office (SOHO) devices to SDWAN fabric or VPN headends.

In today's world of increasing and evolving attacks on networks, organizations are moving towards a zero-trust philosophy of "never trust, always verify." In this zero-trust security model, trust is established and maintained by continuous authentication and authorization, including monitoring each access in a network. This applies to IKEv2/IPsec secure tunnels as well where the common approach is to periodically refresh the IKEv2 and IPsec session keys. However, it is also becoming important to periodically repeat the mutual authentication of the peers in a network and reevaluate the authorization and access policy based on the security posture and context. While IKEv2 supports re-authentication, it is not efficient, requiring reestablishment of a new session and can cause traffic disruption.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

DESCRIPTION OF EXAMPLE EMBODIMENTS

Overview

Figure 1:
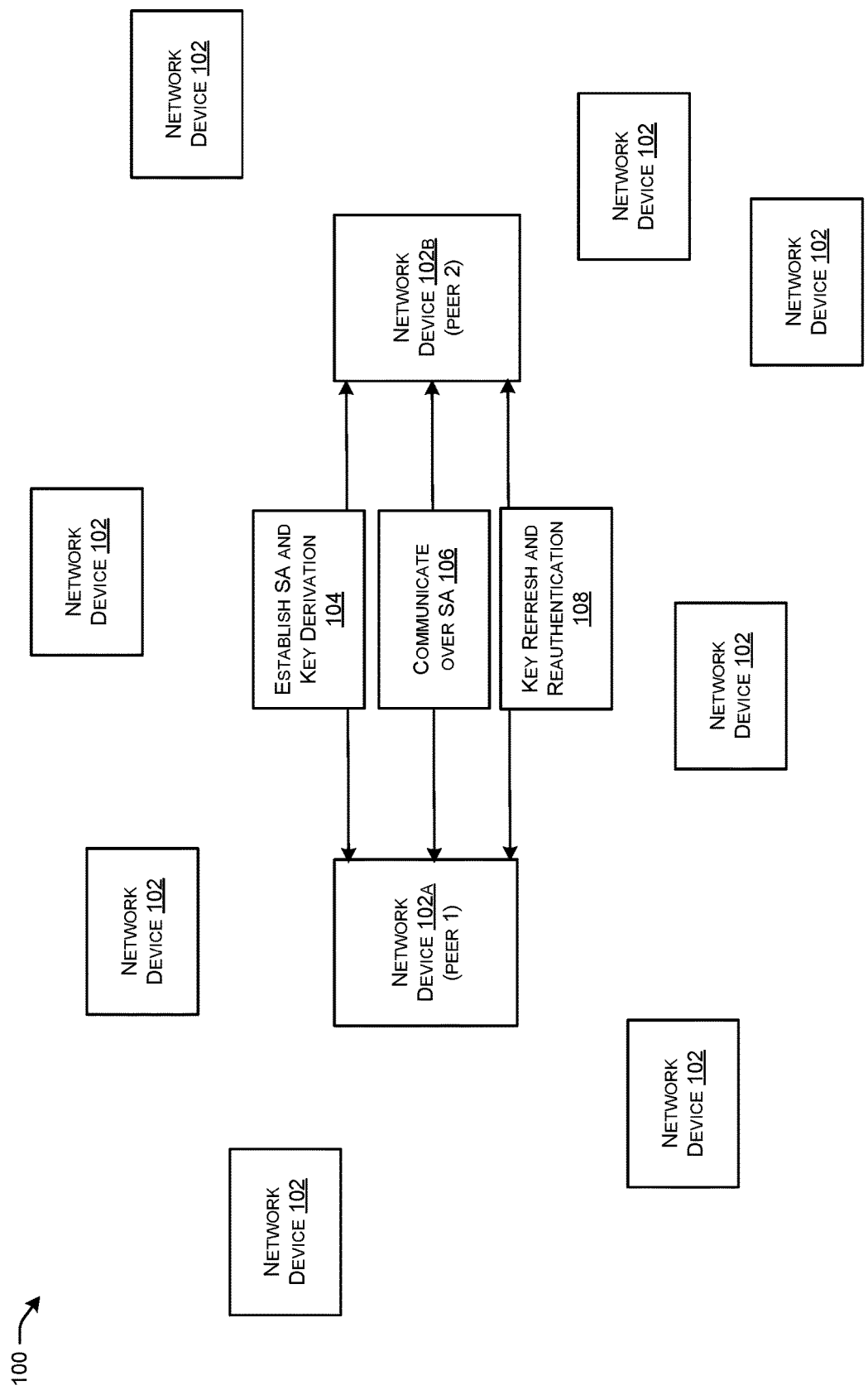
FIG. 1 schematically illustrates an example of a network arrangement that includes multiple network devices that may be configured in one or more ways for Internet Protocol (IP) security (IPsec), where the network devices may be re-authenticated during a key refresh, in accordance with techniques and architecture described herein.

The present disclosure provides techniques and architecture for continuous authentication of peers in networks using post-quantum pre-shared keys (PPKs) by re-authenticating the peers during a key refresh process, which allows efficient re-authentication of peers as part of the IKEv2 and IPsec key refreshes using the PPKs. More particularly, the techniques and architecture provide a method for re-authentication of IKEv2/IPsec secure tunnels during IKE/IPsec rekeys using PPKs, which enables continuous re-authentication of peers that is efficient, without any traffic disruption and post-quantum-secure, ensuring a zero-trust security model.

As an example, a method may include establishing, between a first peer device and a second peer device, a security association (SA) session, where the SA session is based at least in part on a first post-quantum pre-shared key (PPK). The method may also include determining, by the first peer device, that a second PPK is needed. The method may further include sending, by the first peer device to the second peer device, a second PPK identifier (ID) and first authentication data. The method may additionally include based at least in part on the second PPK ID, obtaining, by the second peer device, the second PPK. The method may also include based at least in part on the first authentication data, attempting to verify, by the second peer device, an identity of the first peer device. The method may further include based at least in part on successfully verifying the identity of the first peer device, installing, by the second peer device, a new/refreshed security association (SA) key (e.g., Quantum-safe IKEv2/IPsec session key(s)) based the second PPK. The method may additionally include based at least in part on successfully verifying the identity of the first peer device, sending, by the second peer device to the first device, a response comprising second authentication data. The method may also include based at least in part on the second authentication data, attempting to verify, by the first peer device, an identity of the second peer device. The method may further include based at least in part on successfully verifying the identity of the second peer device, installing, by the first peer device, a new/refreshed security association (SA) key (e.g., Quantum-safe IKEv2/IPsec session key(s)) based the second PPK.

Example Embodiments

In accordance with configurations described herein, as previously noted, techniques and architecture are provided for continuous authentication of peers in networks using post-quantum pre-shared keys (PPKs) by re-authenticating the peers during a key refresh process, which allows efficient re-authentication of peers as part of the IKEv2 and IPsec key refreshes using the PPKs. More particularly, the techniques and architecture provide a method for re-authentication of IKEv2/IPsec secure tunnels during IKE/IPsec rekeys using PPKs, which enables continuous re-authentication of peers that is efficient, without any traffic disruption and post-quantum-secure, ensuring a zero-trust security model.

More particularly, in configurations the PPKs (manual PPK or dynamic PPK) are stirred (mixed with DH/ECDH) during key derivation while refreshing the session keys during IKE and IPsec rekey processes (rekeys). In configurations, this involves communicating the PPK-ID from the rekey initiator (peer) to the rekey responder (peer), by adding a PPK_ID payload in the rekey message exchange. This enables stronger quantum safe session keys, when dynamic PPK is used or when the manual PPK is rotated frequently.

In configurations, the knowledge of the shared PPK is proved by having both peers exchange authentication payload signed with a PPK. This involves exchanging a IKEv2 NOTIFY payload "AUTH_PPK" to carry PPK-signed authentication data. This serves the purpose of frequent re-authentication of the peers as part of the key refreshes (rekeys).

In configurations, a IKEv2 status notification payload is defined, NOTIFY (PPK_AUTH, AUTH_DATA). The AUTH_DATA is computed using syntax for pre-shared secret authentication described in IKEv2 RFC 7296 section 2.15, with a PPK used as the "Shared Secret." The AUTH_DATA computation is similar to the one used for NO_PPK_AUTH described in RFC-8784 and NULL_AUTH described in RFC-7619. RFC-8784 relates to mixing pre-shared keys in IKEv2 for post-quantum security and defines post-quantum pre-shared keys (PPKs), which is a shared secret provisioned on IKEv2 peers. The PPKs can either be configured manually, referred to as manual PPK, or may be dynamically generated using a secure key integration protocol that imports key material from synchronized external key sources such as quantum key distribution (QKD), referred to as dynamic PPK. The PPKs are used as additional input in the derivation of session keys. This ensures that the IKEv2/IPsec session key derivation is quantum safe. QKD is a solution based on quantum physics that allows communication of keys over media like optical fiber and free space, with the ability to detect any interception or eavesdropping and discard the keys, thus providing an interception-proof channel for key communication.

In configurations, if the initial authentication as part of the session bring-up is quantum safe either based on post-quantum certificates or PPK-ONLY authentication as described in RFC-8784, the entire IKEv2/IPsec session is quantum safe with respect to key derivation as well as authentication and re-authentication.

More particularly, in configurations, a first peer may serve as, for example, an IKEv2 rekey-initiator for initiating a key refresh (rekey process) with a second peer, which serves as a IKEv2 rekey-responder. Thus, the first peer and the second peer have already authenticated each other and created a SA session.

The IKEv2 rekey-initiator fetches a new PPK and the corresponding PPK-ID from config in the scenario of manual PPK or from an external key source such as QKD over a secure key integration protocol in the scenario of dynamic PPK. The IKEv2 rekey-initiator computes the initiator AUTH_DATA using the syntax for pre-shared secret authentication described in IKEv2 RFC 7296 section 2.15, with PPK used as the shared secret. Note that the AUTH_DATA computation is similar to the one used for NO_PPK_AUTH described in RFC-8784 and NULL_AUTH described in RFC-7619. In a CREATE_CHILD_SA request generated by the IKEv2 rekey-initiator, the following payloads are included: notify payload, N(PPK_IDENTITY, PPK_ID) to communicate the PPK-ID and notify payload, N(PPK_AUTH, AUTH_DATA) to communicate the initiator AUTH_DATA. The IKEv2 rekey-initiator sends the CREATE_CHILD_SA request to the IKEv2 rekey-responder.

In configurations, the IKEN2 rekey-responder receives the CREATE_CHILD_SA request from the IKEv2 rekey-initiator containing N(PPK_IDENTITY, PPK_ID) and N(PPK_AUTH, AUTH_DATA). The IKEv2 rekey-responder retrieves the PPK_ID from the N(PPK_IDENTITY, PPK_ID) payload. The IKEv2 rekey-responder fetches the PPK corresponding to the received PPK-ID from the config (in the case of manual PPK) or from an external key source such as QKD over a secure key integration protocol (in the case of dynamic PPK). The IKEv2 rekey-responder computes the IKEv2 rekey-initiator AUTH_DATA using the fetched PPK and compares the computed AUTH_DATA with the AUTH_DATA received from the IKEv2 rekey-initiator. If the IKEv2 rekey-initiator AUTH_DATA verification is successful, the IKEv2 rekey-responder installs the new (refreshed) SA key. The IKEv2 rekey-responder computes the IKEv2 rekey-responder AUTH_DATA using the fetched PPK and the method previously described with respect to the IKEv2 rekey-initiator AUTH_DATA. The IKEv2 rekey-responder includes the IKEv2 rekey-responder AUTH_DATA in the N(PPK_AUTH. AUTH_DATA) and sends the CREATE_CHILD_SA response to the IKEv2 rekey-initiator. If the IKEv2 rekey-initiator AUTH_DATA verification fails, then the IKEv2 rekey-responder sends an error notification with an error code ERROR_PPK_AUTH_FAILED.

In configurations, the IKEv2 rekey-initiator receives the CREATE_CHILD_SA response from the IKEv2 rekey-responder containing (PPK_AUTH, AUTH_DATA). The IKEv2 rekey-initiator computes the IKEv2 rekey-responder AUTH_DATA using the PPK and compares the computed AUTH_DATA with the AUTH_DATA received from the IKEv2 rekey-responder. If the IKEv2 rekey-responder AUTH_DATA verification is successful, the IKEv2 rekey-initiator installs the new/refreshed SA key. If the IKEv2 rekey-responder AUTH_DATA verification fails, in configurations the IKEv2 rekey-initiator may send a delete SA notification to the IKEv2 rekey-responder and destroy the new SA. If it is an IKEv2 SA rekey that failed, the IKEv2 rekey-initiator may bring down the IKEv2 SA and all child SAs. If it is an IPsec SA rekey that failed, the IKEv2 rekey-initiator may delete that specific child SA.

Accordingly, in configurations, a method includes establishing, between a first peer device and a second peer device, a security association (SA) session, where the SA session is based at least in part on a first post-quantum pre-shared key (PPK). The method also includes determining, by the first peer device, that a second PPK is needed. The method further includes sending, by the first peer device to the second peer device, a second PPK identifier (ID) and first authentication data. The method additionally includes based at least in part on the second PPK ID, obtaining, by the second peer device, the second PPK. The method also includes based at least in part on the first authentication data, attempting to verify, by the second peer device, an identity of the first peer device. The method further includes based at least in part on successfully verifying the identity of the first peer device, installing, by the second peer device, a new/refreshed security association (SA) key (e.g., Quantum-safe IKEv2/IPsec session key(s)) based the second PPK. The method additionally includes based at least in part on successfully verifying the identity of the first peer device, sending, by the second peer device to the first device, a response comprising second authentication data. The method also includes based at least in part on the second authentication data, attempting to verify, by the first peer device, an identity of the second peer device. The method further includes based at least in part on successfully verifying the identity of the second peer device, installing, by the first peer device, a new/refreshed security association (SA) key (e.g., Quantum-safe IKEv2/IPsec session key(s)) based the second PPK.

In some configurations, the method also comprises, based at least in part on unsuccessfully verifying the identity of the first peer device, discarding, by the second peer device, the second PPK, and sending, by the second peer device to the first device, an authentication failure response.

In further configurations, the method further comprises, based at least in part on unsuccessfully verifying the identity of the second peer device, destroying, by the first peer device, the SA session, and sending, by the second peer device to the first device, an authentication failure response.

In additional configurations, attempting to verify the identity of the first peer device comprises generating, using the second PPK, computed first authentication data of the first peer device, and comparing the computed first authentication data with the first authentication data.

In some configurations, attempting to verify the identity of the second peer device comprises generating, using the second PPK, computed second authentication data of the second peer device, and comparing the computed second authentication data with the second authentication data.

In further configurations, obtaining the second PPK comprises based at least in part on the second PPK ID, manually configuring the second PPK.

In additional configurations, obtaining the second PPK comprises based at least in part on the second PPK ID, dynamically configuring the second PPK.

Thus, the techniques and architecture provide for continuous authentication of peers in networks using post-quantum pre-shared keys (PPKs) by re-authenticating the peers during a key refresh process, which allows efficient re-authentication of peers as part of the IKEv2 and IPsec key refreshes using the PPKs. More particularly, the techniques and architecture provide a method for re-authentication of IKEv2/IPsec secure tunnels during IKE/IPsec rekeys using post-quantum pre-shared keys. This method enables continuous re-authentication of peers that is efficient, without any traffic disruption and post-quantum-secure, ensuring a zero-trust security model.

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

FIG. 1 schematically illustrates an example of a network 100 that includes multiple network devices 102. Each network device may be configured in one or more ways for Internet Protocol (IP) security (IPsec). Thus, each of the network devices 102 may be a "peer" in some form such as, for example, an IPsec peer. Examples of IPsec peers may include a router, a switch, a firewall, a connect device, etc. Thus, each IPsec peer may basically be any type of device running an IPsec. Examples of network 100 may include on-premises networks, fabric networks, cloud networks, hybrid-cloud networks, software-defined wide area networks (SDWANs), secure access service edges (SASEs), remote access networks, Internet of Things (IoT) networks, etc. The example network 100 may also be made up of one or more of on-premises networks, fabric networks, cloud networks, hybrid-cloud networks, SDWANs, SASEs, remote access networks, and/or IoT networks, etc.

In the example of FIG. 1, a first network device 102a may serve as a first peer and a second network device 102b may serve as a second peer. At 104, the two network devices 102a, 102b may establish a security association (SA) session using a key derivation function. The key derivation function may be in accordance with the Diffie-Hellman (DH)/elliptic-curve DH (ECDH) protocols. Once the SA session is established, at 106 the two network devices 102a, 102b may communicate over the SA session.

In accordance with IKEv2/IPsec protocols, at 108, a periodic key refresh (rekey process) may be performed. The key refresh involves generating a new key for the SA session. Depending on the key refresh requirements of the first network device 102a (peer) and the key refresh of the second network device 102b (peer), the key refresh occurs based on the shorter of the two key refresh requirements. For example, if the first network device 102a requires a key refresh every 30 minutes but the second network device 102b requires a key refresh every hour, then the key refresh may occur every thirty minutes.

Currently, during key refresh, reauthentication of the two network devices 102a. 102b, e.g., the two peers, is not performed. In accordance with configurations described herein, the two network devices 102a. 102b reauthenticate each other at 108 during the key refresh. Additionally, in accordance with configurations described herein, the key derivation function involves using a post-quantum pre-shared key (PPK). In accordance with, for example, RFC-8784, the IKEv2 key derivation function utilizes a shared secret. In configurations, the PPK may be used as the shared secret of the two network devices 102a, 102b, as described herein.

Figure 2:
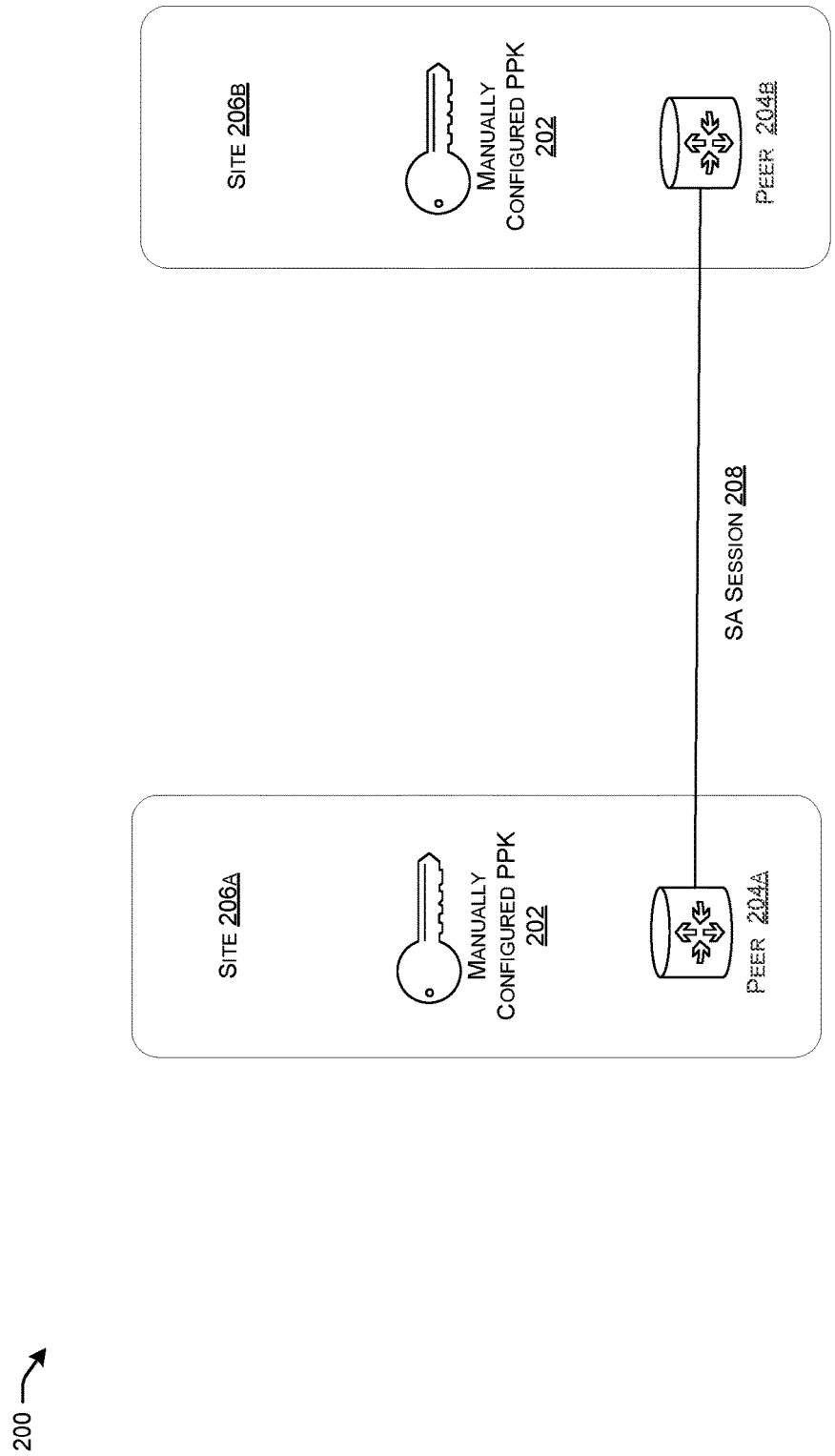
FIG. 2 schematically illustrates generating producing quantum safe session keys with manual PPK generation derivation, in accordance with techniques and architecture described herein.

Referring to FIG. 2, in configurations, a PPK 202 may be manually configured. In accordance with RFC-8784, the manual process produces quantum safe session keys with manual PPK generation derivation. The manually configured PPK 202 may be configured and shared among two peers 204a. 204b, e.g., network devices 102a. 102b, at different sites 206a. 206b within a network 200, e.g., network 100 of FIG. 1. Whichever peer 204a, 204b has the shorter key refresh requirement, e.g., first network device 102a in the example of FIG. 1, may serve as an initiator, while the second peer, e.g., network device 102b in the example of FIG. 1, may serve as a responder. With the manually configured PPK 202, the PPK-based encryption key is quantum safe for a SA session 208 between the peer 204a and the peer 204b.

Figure 3A:
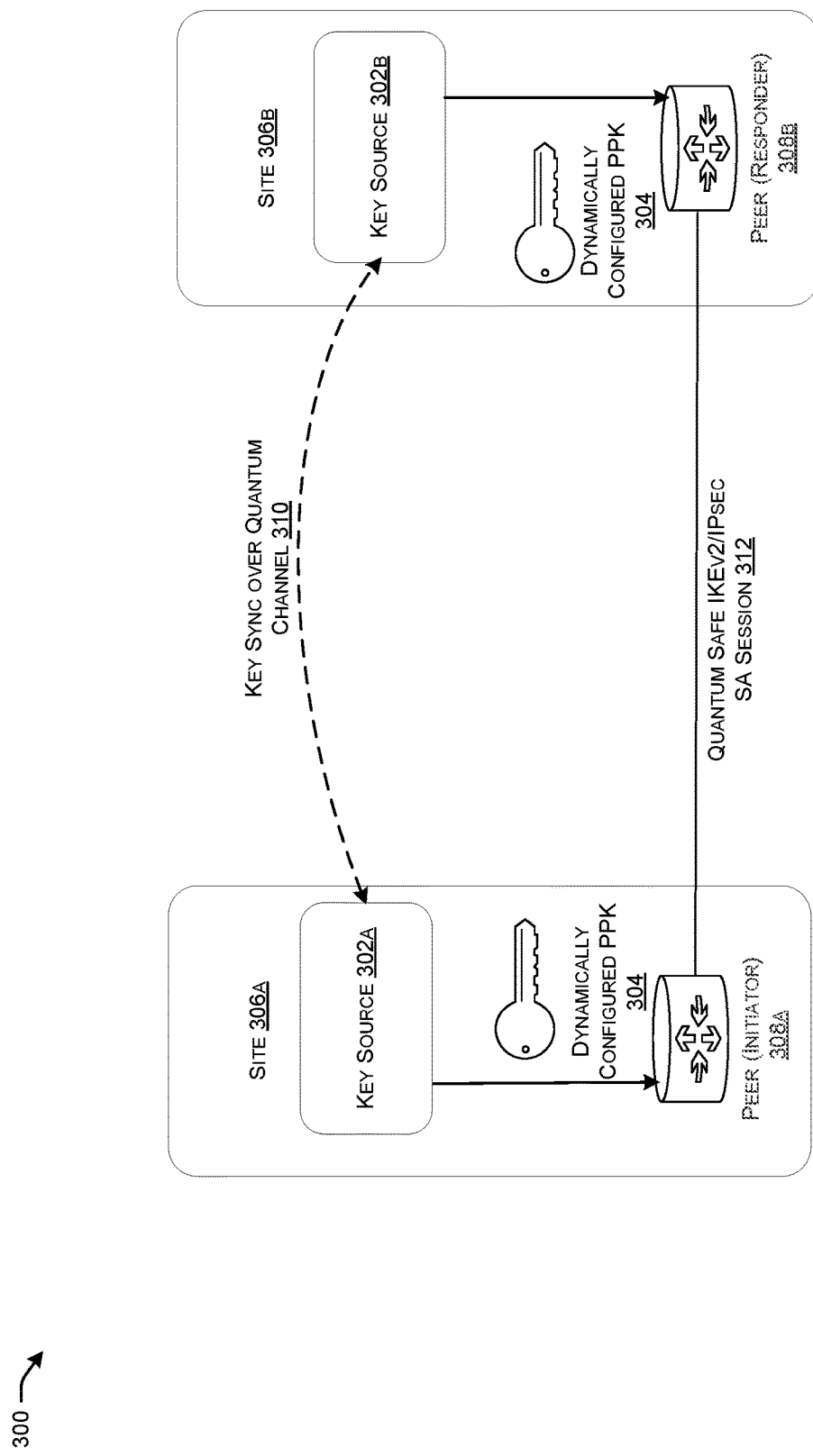
FIGS. 3A and 3B schematically illustrate dynamically generating quantum safe session keys using a secure key integration protocol for configuration, in accordance with techniques and architecture described herein.

In configurations, quantum safe session keys may be configured using a secure key integration protocol. Referring to FIG. 3A, quantum safe session keys may be dynamically generated using a secure key integration protocol that imports key material from synchronized external key sources 302a, 302b, such as, for example, quantum key distribution (QKD), over a quantum channel 310 referred to as dynamic PPK. The secure key integration protocol may be utilized to sync a PPK 304 among a key source 302a at a first site 306a of a network 300 that includes a first peer 308a serving as the initiator, e.g., the first network device 102a of the example of FIG. 1, while a second peer 308b of the network 300 serving as the responder, e.g., network device 102b of the example of FIG. 1, may obtain the PPK via the secure key integration protocol from a key source 302b located at the site 306b that includes the second peer 308b. Thus, initiator peer 308a and the responder peer 308b will have the same PPK 304 for a quantum safe IKEv2/IPsec SA session 312.

Figure 3B:
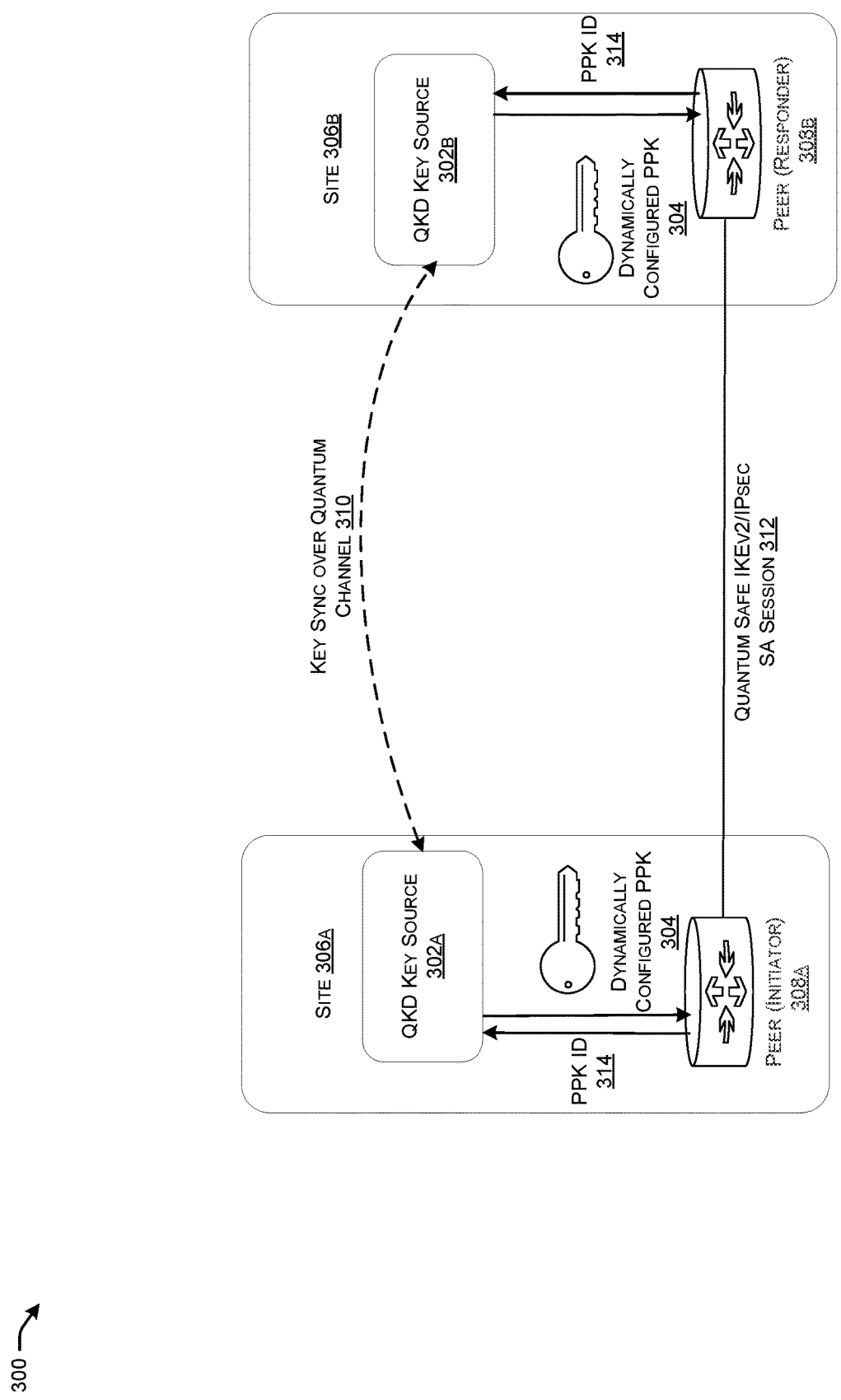

Referring to FIG. 3B, the synchronized external key sources 302a, 302b may be in the form of QKD devices, with a first QKD key source 302a located at the first site 306a and a second QKD key source 302b located at the second site 306b. A quantum channel 310 is established between the two QKD key sources 302a. 302b for syncing the dynamically configured PPK 304 between the two QKD devices 302a, 302b. The secure key integration protocol may be performed by a QKD key source 302 and an encryptor, and used by the encryor to query a PPL from the QKD key source 302. The secure key integration protocol may be utilized to provide the PPK 304 and the PPK-ID 314 from the first QKD device 302a to the first peer 308a (initiator), while the secure key integration protocol may be utilized to supply the PPK 304 to the second peer 308b (responder) based on the PPK ID 314. The IKEv2 key signaling protocol may be utilized between the two peers 308a, 308b, e.g., the initiator and the responder, to provide the quantum safe IKEv2/IPsec SA session 312.

As previously mentioned, in configurations, the two peers, e.g., network devices 102a. 102b of FIG. 1, peers 204a, 204b of FIG. 2, and peers 308a, 308b of FIGS. 3A and 3B, reauthenticate each other during a key refresh process. The peers may reauthenticate each other based upon a shared secret, which in configurations, is the PPK.

As previously noted, in configurations the PPKs (manual PPK or dynamic PPK) are stirred (mixed with DH/ECDH) during key derivation while refreshing the session keys during IKE and IPsec rekey processes (rekeys). In configurations, this involves communicating the PPK-ID from the rekey initiator (peer) to the rekey responder (peer), by adding a PPK_ID payload in the rekey message exchange. This enables stronger quantum safe session keys, when dynamic PPK is used or when the manual PPK is rotated frequently.

In configurations, the knowledge of the shared PPK is proved by having both peers exchange authentication payload signed with a PPK. This involves exchanging a IKEv2 NOTIFY payload "AUTH_PPK" to carry PPK-signed authentication data. This serves the purpose of frequent re-authentication of the peers as part of the key refreshes (rekeys).

In configurations, a IKEv2 status notification payload is defined, NOTIFY (PPK_AUTH, AUTH_DATA). The AUTH_DATA is computed using syntax for pre-shared secret authentication described in IKEv2 RFC 7296 section 2.15, with a PPK used as the "Shared Secret." The AUTH_DATA computation is similar to the one used for NO_PPK_AUTH described in RFC-8784 and NULL_AUTH described in RFC-7619. RFC-8784 relates to mixing pre-shared keys in IKEv2 for post-quantum security and defines post-quantum pre-shared keys (PPKs), which is a shared secret provisionied on IKEv2 peers. The PPKs can either be configured manually, referred to as manual PPK, or may be dynamically generated using a secure key integration protocol that imports key material from synchronized external key sources such as quantum key distribution (QKD), referred to in as dynamic PPK. The PPKs are used as additional input in the derivation of session keys. This ensures that the IKEv2/IPsec session key derivation is quantum safe. QKD is a solution based on quantum physics that allows communication of keys over media like optical fiber and free space, with the ability to detect any interception or eavesdropping and discard the keys, thus providing an interception-proof channel for key communication.

In configurations, if the initial authentication as part of the session bring-up is quantum safe either based on post-quantum certificates or PPK-ONLY authentication as described in RFC-8784, the entire IKEv2/IPsec session is quantum safe with respect to key derivation as well as authentication and re-authentication.

Figure 4A:
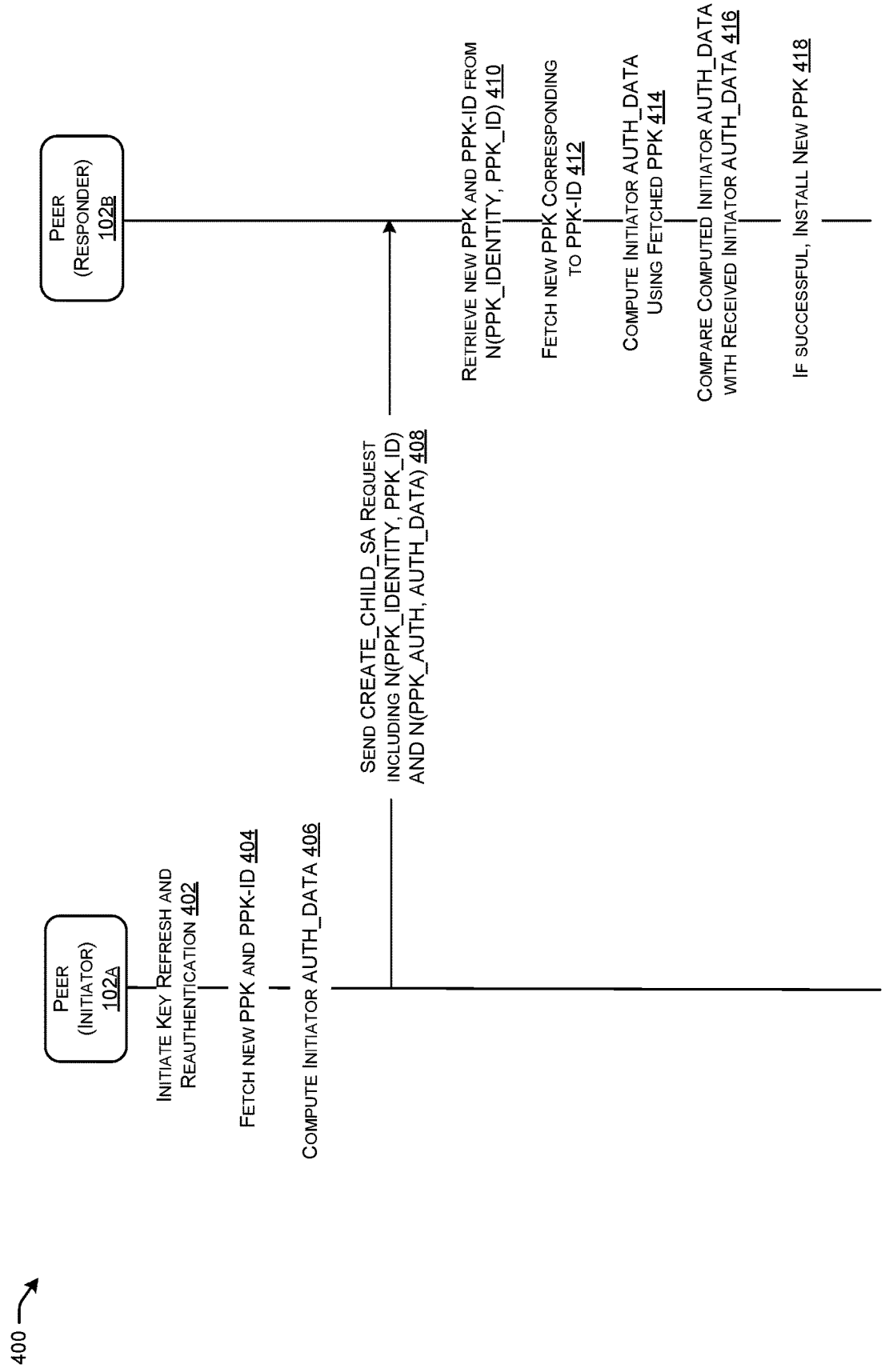
FIGS. 4A and 4B schematically illustrate a flow of steps for key refresh and peer re-authentication to provide continuous authentication of peers with PPKs during IKEv2/IPsec rekeys, in accordance with techniques and architecture described herein.
Figure 4B:
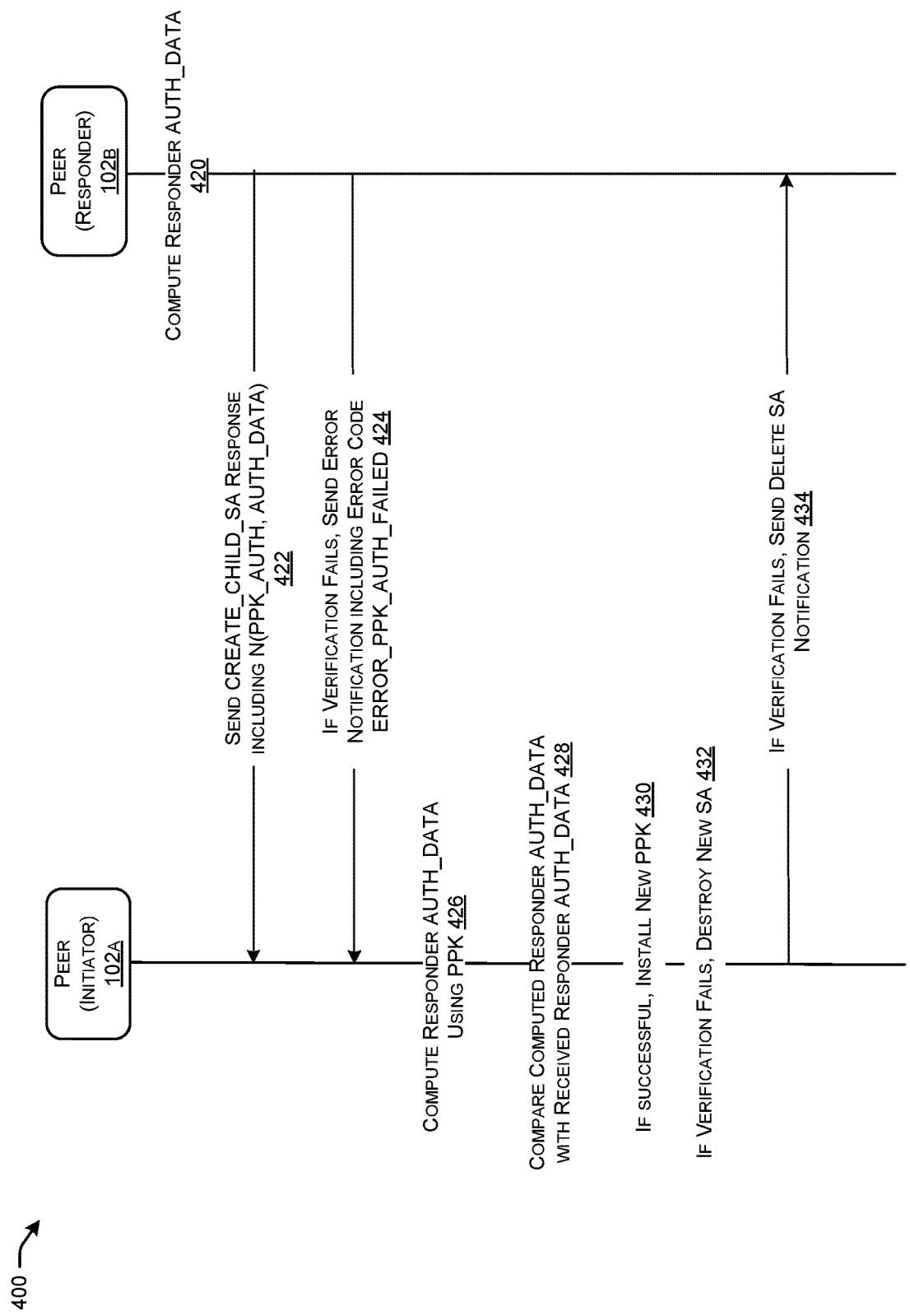

More particularly, FIGS. 4A and 4B schematically illustrate a flow 400 of steps for key refresh and peer re-authentication to provide continuous authentication of peers with PPKs during IKEv2/IPsec rekeys. In configurations, a first peer, e.g., first network device 102a, may serve as, for example, an IKEv2 rekey-initiator for initiating, at 402, a key refresh (rekey process) with a second peer, e.g., second network device 102b, which serves as a IKEv2 rekey-responder. Thus, the first peer and the second peer have already authenticated each other and created a SA session using a PPK.

At 404, the IKEv2 rekey-initiator fetches a new PPK and the corresponding PPK-ID from config in the scenario of manual PPK or from an external key source such as QKD over a secure key integration protocol in the scenario of dynamic PPK. At 406, the IKEv2 rekey-initiator computes the initiator AUTH_DATA using the syntax for pre-shared secret authentication described in IKEv2 RFC 7296 section 2.15, with the PPK used as the shared secret. Note that the AUTH_DATA computation is similar to the one used for NO_PPK_AUTH described in RFC-8784 and NULL_AUTH described in RFC-7619. In a CREATE_CHILD_SA request generated by the IKEv2 rekey-initiator, the following payloads are included: notify payload, N(PPK_IDENTITY, PPK_ID) to communicate the PPK-ID and notify payload, N(PPK_AUTH, AUTH_DATA) to communicate the initiator AUTH_DATA. At 408, the IKEv2 rekey-initiator sends the CREATE_CHILD_SA request to the IKEv2 rekey-responder.

In configurations, the IKEv2 rekey-responder receives the CREATE_CHILD_SA request from the IKEv2 rekey-initiator containing N(PPK_IDENTITY, PPK_ID) and N(PPK_AUTH, AUTH_DATA). At 410, the IKEv2 rekey-responder retrieves the PPK_ID from the N(PPK_IDENTITY, PPK_ID) payload. At 412, the IKEv2 rekey-responder fetches the PPK corresponding to the received PPK-ID from the config (in the case of manual PPK) or from an external key source such as QKD over a secure key integration protocol (in the case of dynamic PPK). At 414, the IKEv2 rekey-responder computes the IKEv2 rekey-initiator AUTH_DATA using the fetched PPK. At 416, the IKEv2 rekey-responder compares the computed AUTH_DATA with the AUTH_DATA received from the IKEv2 rekey-initiator. At 418, if the IKEv2 rekey-initiator AUTH_DATA verification is successful, the IKEv2 rekey-responder installs the new (refreshed) SA key. At 420, the IKEv2 rekey-responder computes the IKEv2 rekey-responder AUTH_DATA using the fetched PPK and the method previously described with respect to the IKEv2 rekey-initiator AUTH_DATA. In a CREATE_CHILD_SA response generated by the IKEv2 rekey-responder, the IKEv2 rekey-responder includes the IKEv2 rekey-responder AUTH_DATA in the N(PPK_AUTH, AUTH_DATA) and at 422, sends the CREATE_CHILD_SA response to the IKEv2 rekey-initiator. At 424, if the IKEv2 rekey-initiator AUTH_DATA verification fails, then the IKEv2 rekey-responder sends an error notification with an error code ERROR_PPK_AUTH_FAILED.

In configurations, the IKEv2 rekey-initiator receives the CREATE_CHILD_SA response from the IKEv2 rekey-responder containing (PPK_AUTH, AUTH_DATA). At 426, the IKEv2 rekey-initiator computes the IKEv2 rekey-responder AUTH_DATA using the PPK. At 428, the IKEv2 rekey-initiator compares the computed AUTH_DATA with the AUTH_DATA received from the IKEv2 rekey-responder. At 430, if the IKEv2 rekey-responder AUTH_DATA verification is successful, the IKEv2 rekey-initiator installs the new/refreshed SA key. At 432, if the IKEv2 rekey-responder AUTH_DATA verification fails, the IKEv2 rekey-initiator sends a delete SA notification to the IKEv2 rekey-responder and destroys the new SA. If it is the IKEv2 SA rekey that failed, in configurations the IKEv2 rekey-initiator may bring down the IKEv2 SA and all child SAs. If it is an IPsec SA rekey that failed, in configurations, the IKEv2 rekey-initiator may delete that specific child SA.

Figure 5:
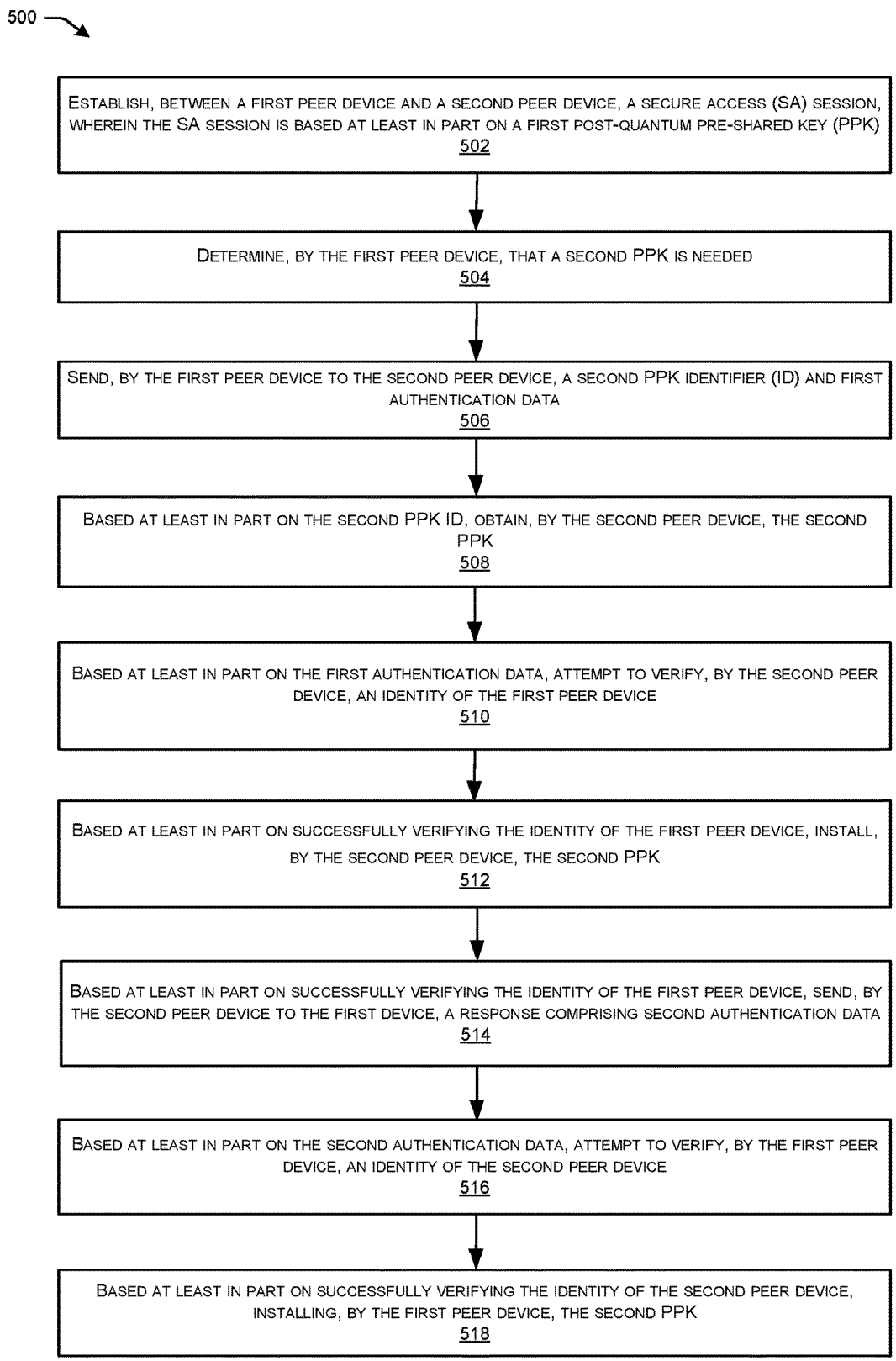
FIG. 5 illustrates a flow diagram of an example method for key refresh and peer re-authentication to provide continuous authentication of peers with PPKs during IKEv2/IPsec rekeys, in accordance with the techniques and architecture described herein.

FIG. 5 illustrates a flow diagram of an example method 500 and illustrates aspects of the functions performed at least partly by devices of a network as described with respect to FIGS. 1-4. The logical operations described herein with respect to FIG. 5 may be implemented (1) as a sequence of computer-implemented acts or program modules running on a computing system, and/or (2) as interconnected machine logic circuits or circuit modules within the computing system.

The implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special purpose digital logic, and any combination thereof. It should also be appreciated that more or fewer operations might be performed than shown in FIG. 5 and described herein. These operations can also be performed in parallel, or in a different order than those described herein. Some or all of these operations can also be performed by components other than those specifically identified. Although the techniques described in this disclosure are with reference to specific components, in other examples, the techniques may be implemented by less components, more components, different components, or any configuration of components.

FIG. 5 illustrates a flow diagram of an example method 500 for key refresh and peer re-authentication to provide continuous authentication of peers with PPKs during IKEv2/IPsec rekeys. In some examples, the method 500 may be performed by a system comprising one or more processors and one or more non-transitory computer-readable media storing computer-executable instructions that, when executed by the one or more processors, cause the one or more processors to perform the method 500.

At 502, a security association (SA) session is established between a first peer device and a second peer device, wherein the SA session is based at least in part on a first post-quantum pre-shared key (PPK). For example, a first peer may serve as, for example, an IKEv2 rekey-initiator for initiating a key refresh (rekey process) with a second peer, which serves as a IKEv2 rekey-responder. Thus, the first peer and the second peer have already authenticated each other and created a SA session with a first PPK.

At 504, the first peer device determines that a second PPK is needed. For example, in accordance with IKEv2/IPsec protocols, at 108, a periodic key refresh (rekey process) may be performed. The key refresh involves generating a new key for the SA session. Depending on the key refresh requirements of the first network device 102a (peer) and the key refresh of the second network device 102b (peer), the key refresh occurs based on the shorter of the two key refresh requirements. For example, if the first network device 102a requires a key refresh every 30 minutes but the second network device 102b requires a key refresh every hour, then the key refresh may occur every thirty minutes.

At 506, the first peer device sends a second PPK identifier (ID) and first authentication data to the second peer device. For example, the IKEv2 rekey-initiator fetches a new PPK and the corresponding PPK-ID from config in the scenario of manual PPK or from an external key source such as QKD over a secure key integration protocol in the scenario of dynamic PPK. At 406, the IKEv2 rekey-initiator computes the initiator AUTH_DATA using the syntax for pre-shared secret authentication described in IKEv2 RFC 7296 section 2.15, with the PPK used as the shared secret. Note that the AUTH_DATA computation is similar to the one used for NO_PPK_AUTH described in RFC-8784 and NULL_AUTH described in RFC-7619. In a CREATE_CHILD_SA request generated by the IKEv2 rekey-initiator, the following payloads are included: notify payload, N(PPK_IDENTITY, PPK_ID) to communicate the PPK-ID and notify payload, N(PPK_AUTH, AUTH_DATA) to communicate the initiator AUTH_DATA. At 408, the IKEv2 rekey-initiator sends the CREATE_CHILD_SA request to the IKEv2 rekey-responder.

At 508, based at least in part on the second PPK ID, the second peer device obtains the second PPK. For example, in configurations, the IKEv2 rekey-responder receives the CREATE_CHILD_SA request from the IKEv2 rekey-initiator containing N(PPK_IDENTITY, PPK_ID) and N(PPK_AUTH, AUTH_DATA). The IKEv2 rekey-responder retrieves the PPK_ID from the N(PPK_IDENTITY, PPK_ID) payload. The IKEv2 rekey-responder fetches the PPK corresponding to the received PPK-ID from the config (in the case of manual PPK) or from an external key source such as QKD over a secure key integration protocol (in the case of dynamic PPK).

At 510, based at least in part on the first authentication data, the second peer device attempts to verify an identity of the first peer device. For example, the IKEv2 rekey-responder computes the IKEv2 rekey-initiator AUTH_DATA using the fetched PPK. The IKEv2 rekey-responder compares the computed AUTH_DATA with the AUTH_DATA received from the IKEv2 rekey-initiator.

At 512, based at least in part on successfully verifying the identity of the first peer device, the second peer device installs the second PPK. For example, if the IKEv2 rekey-initiator AUTH_DATA verification is successful, the IKEv2 rekey-responder installs the new (refreshed) SA key.

At 514, based at least in part on successfully verifying the identity of the first peer device, the second peer device sends a response comprising second authentication data to the first device. For example, the IKEv2 rekey-responder computes the IKEv2 rekey-responder AUTH_DATA using the fetched PPK and the method previously described with respect to the IKEv2 rekey-initiator AUTH_DATA. The IKEv2 rekey-responder includes the IKEv2 rekey-responder AUTH_DATA in the N(PPK_AUTH, AUTH_DATA) and sends the CREATE_CHILD_SA response to the IKEv2 rekey-initiator. However, if the IKEv2 rekey-initiator AUTH_DATA verification fails, then the IKEv2 rekey-responder sends an error notification with an error code ERROR_PPK_AUTH_FAILED.

At 516, based at least in part on the second authentication data, the first peer device attempts to verify an identity of the second peer device. For example, in configurations, the IKEv2 rekey-initiator receives the CREATE_CHILD_SA response from the IKEv2 rekey-responder containing (PPK_AUTH, AUTH_DATA). The IKEv2 rekey-initiator computes the IKEv2 rekey-responder AUTH_DATA using the PPK. The IKEv2 rekey-initiator compares the computed AUTH_DATA with the AUTH_DATA received from the IKEv2 rekey-responder.

At 518, based at least in part on successfully verifying the identity of the second peer device, the first peer device installs the second PPK. For example, if the IKEv2 rekey-responder AUTH_DATA verification is successful, the IKEv2 rekey-initiator installs the new/refreshed SA key. However, if the IKEv2 rekey-responder AUTH_DATA verification fails, the IKEv2 rekey-initiator sends a delete SA notification to the IKEv2 rekey-responder and destroys the new SA. If it is the IKEv2 SA rekey that failed, in configurations the IKEv2 rekey-initiator may bring down the IKEv2 SA and all child SAs. If it is an IPsec SA rekey that failed, in configurations, the IKEv2 rekey-initiator may delete that specific child SA.

Thus, in accordance with configurations described herein, the techniques and architecture provide for continuous authentication of peers in networks using post-quantum pre-shared keys (PPKs) by re-authenticating the peers during a key refresh process, which allows efficient re-authentication of peers as part of the IKEv2 and IPsec key refreshes using the PPKs. More particularly, the techniques and architecture provide a method for re-authentication of IKEv2/IPsec secure tunnels during IKE/IPsec rekeys using post-quantum pre-shared keys. This method enables continuous re-authentication of peers that is efficient, without any traffic disruption and post-quantum-secure, ensuring a zero-trust security model.

Figure 6:
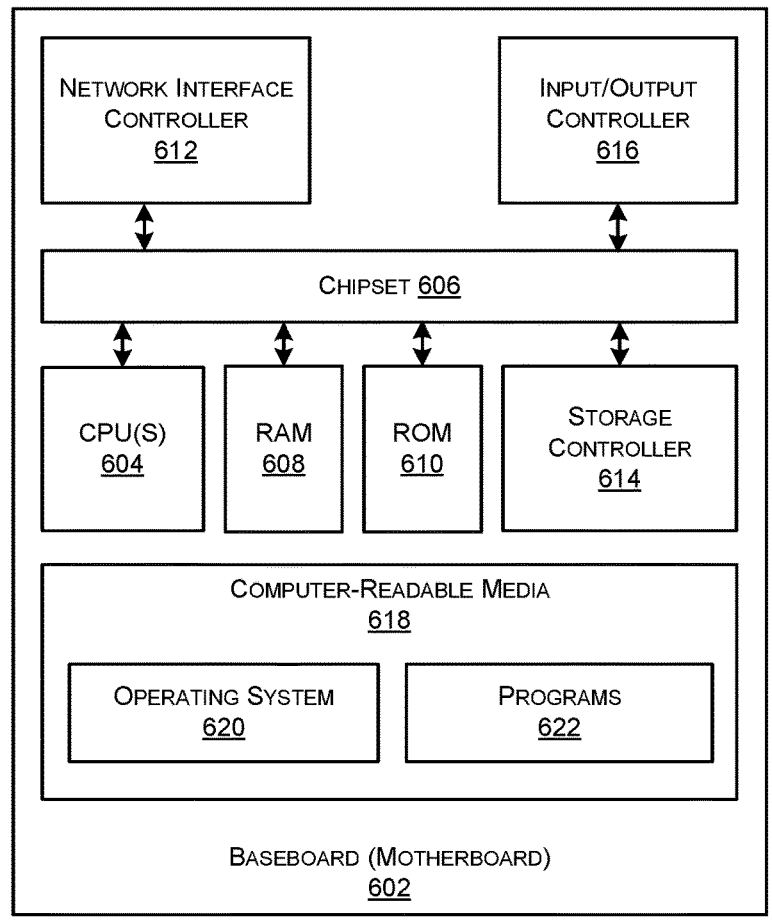
FIG. 6 is a computer architecture diagram showing an example computer hardware architecture for implementing a device that can be utilized to implement aspects of the various technologies presented herein.

FIG. 6 shows an example computer architecture for a computing device 600 capable of executing program components for implementing the functionality described above. In configurations, one or more of the computing devices 600 may be used to implement one or more of the components of FIGS. 1-5. The computer architecture shown in FIG. 6 illustrates a conventional server computer, router, switch, workstation, desktop computer, laptop, tablet, network appliance, e-reader, smartphone, or other computing device, and can be utilized to execute any of the software components presented herein. The computing device 600 may, in some examples, correspond to a physical device or resources described herein.

The computing device 600 includes a baseboard 602, or "motherboard," which is a printed circuit board to which a multitude of components or devices can be connected by way of a system bus or other electrical communication paths. In one illustrative configuration, one or more central processing units ("CPUs") 604 operate in conjunction with a chipset 606. The CPUs 604 can be standard programmable processors that perform arithmetic and logical operations necessary for the operation of the computing device 600.

The CPUs 604 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 606 provides an interface between the CPUs 604 and the remainder of the components and devices on the baseboard 602. The chipset 606 can provide an interface to a RAM 608, used as the main memory in the computing device 600. The chipset 606 can further provide an interface to a computer-readable storage medium such as a read-only memory ("ROM") 610 or non-volatile RAM ("NVRAM") for storing basic routines that help to startup the computing device 600 and to transfer information between the various components and devices. The ROM 610 or NVRAM can also store other software components necessary for the operation of the computing device 600 in accordance with the configurations described herein.

The computing device 600 can operate in a networked environment using logical connections to remote computing devices and computer systems through a network. The chipset 606 can include functionality for providing network connectivity through a NIC 612, such as a gigabit Ethernet adapter. In configurations, the NIC 612 can be a smart NIC (based on data processing units (DPUs)) that can be plugged into data center servers to provide networking capability. The NIC 612 is capable of connecting the computing device 600 to other computing devices over networks. It should be appreciated that multiple NICs 612 can be present in the computing device 600, connecting the computer to other types of networks and remote computer systems.

The computing device 600 can include a storage device 618 that provides non-volatile storage for the computer. The storage device 618 can store an operating system 620, programs 622, and data, which have been described in greater detail herein. The storage device 618 can be connected to the computing device 600 through a storage controller 614 connected to the chipset 606. The storage device 618 can consist of one or more physical storage units. The storage controller 614 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computing device 600 can store data on the storage device 618 by transforming the physical state of the physical storage units to reflect the information being stored. The specific transformation of physical state can depend on various factors, in different embodiments of this description. Examples of such factors can include, but are not limited to, the technology used to implement the physical storage units, whether the storage device 618 is characterized as primary or secondary storage, and the like.

For example, the computing device 600 can store information to the storage device 618 by issuing instructions through the storage controller 614 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computing device 600 can further read information from the storage device 618 by detecting the physical states or characteristics of one or more particular locations within the physical storage units.

In addition to the mass storage device 618 described above, the computing device 600 can have access to other computer-readable storage media to store and retrieve information, such as program modules, data structures, or other data. It should be appreciated by those skilled in the art that computer-readable storage media is any available media that provides for the non-transitory storage of data and that can be accessed by the computing device 600. In some examples, the operations performed by the cloud network, and or any components included therein, may be supported by one or more devices similar to computing device 600. Stated otherwise, some or all of the operations described herein may be performed by one or more computing devices 600 operating in a cloud-based arrangement.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage device 618 can store an operating system 620 utilized to control the operation of the computing device 600. According to one embodiment, the operating system comprises the LINUX operating system. According to another embodiment, the operating system comprises the WINDOWS® SERVER operating system from MICROSOFT Corporation of Redmond, Washington. According to further embodiments, the operating system can comprise the UNIX operating system or one of its variants. It should be appreciated that other operating systems can also be utilized. The storage device 618 can store other system or application programs and data utilized by the computing device 600.

In one embodiment, the storage device 618 or other computer-readable storage media is encoded with computer-executable instructions which, when loaded into the computing device 600, transform the computer from a general-purpose computing system into a special-purpose computer capable of implementing the embodiments described herein. These computer-executable instructions transform the computing device 600 by specifying how the CPUs 604 transition between states, as described above. According to one embodiment, the computing device 600 has access to computer-readable storage media storing computer-executable instructions which, when executed by the computing device 600, perform the various processes described above with regard to FIGS. 1-5. The computing device 600 can also include computer-readable storage media having instructions stored thereupon for performing any of the other computer-implemented operations described herein.

The computing device 600 can also include one or more input/output controllers 616 for receiving and processing input from a number of input devices, such as a keyboard, a mouse, a touchpad, a touch screen, an electronic stylus, or other type of input device. Similarly, an input/output controller 616 can provide output to a display, such as a computer monitor, a flat-panel display, a digital projector, a printer, or other type of output device. It will be appreciated that the computing device 600 might not include all of the components shown in FIG. 6, can include other components that are not explicitly shown in FIG. 6, or might utilize an architecture completely different than that shown in FIG. 6.

The computing device 600 may support a virtualization layer, such as one or more virtual resources executing on the computing device 600. In some examples, the virtualization layer may be supported by a hypervisor that provides one or more virtual machines running on the computing device 600 to perform functions described herein. The virtualization layer may generally support a virtual resource that performs at least portions of the techniques described herein.

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A method comprising:
   establishing, between a first peer device and a second peer device, a security association (SA) session, wherein the SA session is based at least in part on a first post-quantum pre-shared key (PPK);
   determining, by the first peer device, that a second PPK is needed;
   sending, by the first peer device to the second peer device, a second PPK identifier (ID) and first authentication data;
   based at least in part on the second PPK ID, obtaining, by the second peer device, the second PPK;
   based at least in part on the first authentication data, attempting to verify, by the second peer device, an identity of the first peer device;
   based at least in part on successfully verifying the identity of the first peer device, installing, by the second peer device, a refreshed SA key based on the second PPK;
   based at least in part on successfully verifying the identity of the first peer device, sending, by the second peer device to the first device, a response comprising second authentication data;
   based at least in part on the second authentication data, attempting to verify, by the first peer device, an identity of the second peer device; and
   based at least in part on successfully verifying the identity of the second peer device, installing, by the first peer device, the refreshed SA key based on the second PPK.

2. The method of claim 1, further comprising, based at least in part on unsuccessfully verifying the identity of the first peer device:
   discarding, by the second peer device, the second PPK; and
   sending, by the second peer device to the first device, an authentication failure response.

3. The method of claim 1, further comprising, based at least in part on unsuccessfully verifying the identity of the second peer device:
    destroying, by the first peer device, the SA session; and
    sending, by the first peer device to the second peer device, a delete SA session notification.

4. The method of claim 1, wherein attempting to verify the identity of the first peer device comprises:
    generating, using the second PPK, computed first authentication data of the first peer device; and
    comparing the computed first authentication data with the first authentication data.

5. The method of claim 1, wherein attempting to verify the identity of the second peer device comprises:
    generating, using the second PPK, computed second authentication data of the second peer device; and
    comparing the computed second authentication data with the second authentication data.

6. The method of claim 1, wherein obtaining the second PPK comprises:
    based at least in part on the second PPK ID, manually configuring the second PPK.

7. The method of claim 1, wherein obtaining the second PPK comprises:
    based at least in part on the second PPK ID, dynamically configuring the second PPK.

8. A system comprising:
    one or more processors; and
    one or more non-transitory computer-readable media storing computer-executable instructions that, when executed by the one or more processors, cause the one or more processors to perform actions comprising:
        establishing, between a first peer device and a second peer device, a security association (SA) session, wherein the SA session is based at least in part on a first post-quantum pre-shared key (PPK);
        determining, by the first peer device, that a second PPK is needed;
        sending, by the first peer device to the second peer device, a second PPK identifier (ID) and first authentication data;
        based at least in part on the second PPK ID, obtaining, by the second peer device, the second PPK;
        based at least in part on the first authentication data, attempting to verify, by the second peer device, an identity of the first peer device;
        based at least in part on successfully verifying the identity of the first peer device, installing, by the second peer device, a refreshed SA key based on the second PPK;
        based at least in part on successfully verifying the identity of the first peer device, sending, by the second peer device to the first device, a response comprising second authentication data;
        based at least in part on the second authentication data, attempting to verify, by the first peer device, an identity of the second peer device; and
        based at least in part on successfully verifying the identity of the second peer device, installing, by the first peer device, the refreshed SA key based on the second PPK.

9. The system of claim 8, wherein the actions further comprise, based at least in part on unsuccessfully verifying the identity of the first peer device:
    discarding, by the second peer device, the second PPK; and
    sending, by the second peer device to the first device, an authentication failure response.

10. The system of claim 8, wherein the actions further comprise, based at least in part on unsuccessfully verifying the identity of the second peer device:
    destroying, by the first peer device, the SA session; and
    sending, by the first peer device to the second peer device, a delete SA session notification.

11. The system of claim 8, wherein attempting to verify the identity of the first peer device comprises:
    generating, using the second PPK, computed first authentication data of the first peer device; and
    comparing the computed first authentication data with the first authentication data.

12. The system of claim 8, wherein attempting to verify the identity of the second peer device comprises:
    generating, using the second PPK, computed second authentication data of the second peer device; and
    comparing the computed second authentication data with the second authentication data.

13. The system of claim 8, wherein obtaining the second PPK comprises:
    based at least in part on the second PPK ID, manually configuring the second PPK.

14. The system of claim 8, wherein obtaining the second PPK comprises:
    based at least in part on the second PPK ID, dynamically configuring the second PPK.

15. One or more non-transitory computer-readable media storing computer-executable instructions that, when executed by one or more processors, cause the one or more processors to perform actions comprising:
    establishing, between a first peer device and a second peer device, a security association (SA) session, wherein the SA session is based at least in part on a first post-quantum pre-shared key (PPK);
    determining, by the first peer device, that a second PPK is needed;
    sending, by the first peer device to the second peer device, a second PPK identifier (ID) and first authentication data;
    based at least in part on the second PPK ID, obtaining, by the second peer device, the second PPK;
    based at least in part on the first authentication data, attempting to verify, by the second peer device, an identity of the first peer device;
    based at least in part on successfully verifying the identity of the first peer device, installing, by the second peer device, a refreshed SA key based on the second PPK;
    based at least in part on successfully verifying the identity of the first peer device, sending, by the second peer device to the first device, a response comprising second authentication data;
    based at least in part on the second authentication data, attempting to verify, by the first peer device, an identity of the second peer device; and
    based at least in part on successfully verifying the identity of the second peer device, installing, by the first peer device, the refreshed SA key based on the second PPK.

16. The one or more non-transitory computer-readable media of claim 15, wherein the actions further comprise, based at least in part on unsuccessfully verifying the identity of the first peer device:
    discarding, by the second peer device, the second PPK; and
    sending, by the second peer device to the first device, an authentication failure response.

17. The one or more non-transitory computer-readable media of claim 15 wherein the actions further comprise, based at least in part on unsuccessfully verifying the identity of the second peer device:
- destroying, by the first peer device, the SA session; and
- sending, by the first peer device to the second peer device, a delete SA session notification.

18. The one or more non-transitory computer-readable media of claim 15, wherein attempting to verify the identity of the first peer device comprises:
- generating, using the second PPK, computed first authentication data of the first peer device; and
- comparing the computed first authentication data with the first authentication data.

19. The one or more non-transitory computer-readable media of claim 15, wherein attempting to verify the identity of the second peer device comprises:
- generating, using the second PPK, computed second authentication data of the second peer device; and
- comparing the computed second authentication data with the second authentication data.

20. The one or more non-transitory computer-readable media of claim 15, wherein obtaining the second PPK comprises:
- based at least in part on the second PPK ID, dynamically configuring the second PPK.

* * * * *